(12) United States Patent
Berger et al.

(10) Patent No.: US 8,309,875 B2
(45) Date of Patent: Nov. 13, 2012

(54) APPARATUS AND METHOD FOR MAKING BORES IN AN EDGE OF A TURBINE BLADE

(75) Inventors: Ingo Berger, Zeuthen (DE); Uwe Dunkel, Berlin (DE); Steffi Raue, Berlin (DE)

(73) Assignee: Siemens Aktiengesellschaft, München (DE)

( * ) Notice: Subject to any disclaimer, the term of this patent is extended or adjusted under 35 U.S.C. 154(b) by 563 days.

(21) Appl. No.: 12/611,434

(22) Filed: Nov. 3, 2009

(65) Prior Publication Data

US 2010/0108644 A1 May 6, 2010

(30) Foreign Application Priority Data

Nov. 4, 2008 (EP) .................................... 08019280

(51) Int. Cl.
*B23K 9/00* (2006.01)
(52) U.S. Cl. ................ 219/69.11; 219/69.12; 219/69.17
(58) Field of Classification Search .................. None
See application file for complete search history.

(56) References Cited

U.S. PATENT DOCUMENTS

| 5,775,856 | A | 7/1998 | Woodard | |
|---|---|---|---|---|
| 6,644,920 | B2 * | 11/2003 | Beeck et al. | 416/97 R |
| 2005/0247569 | A1 * | 11/2005 | Lamphere et al. | 205/663 |
| 2007/0256939 | A1 * | 11/2007 | Wei et al. | 205/674 |
| 2010/0108644 | A1 * | 5/2010 | Berger et al. | 219/69.17 |

FOREIGN PATENT DOCUMENTS

| DE | 2538652 A1 | 3/1977 |
|---|---|---|
| EP | 1964632 A1 | 9/2008 |
| GB | 2143849 A | 2/1985 |

* cited by examiner

*Primary Examiner* — David E Graybill

(57) ABSTRACT

An apparatus for making bores in a turbine blade edge is provided. The apparatus includes a drilling device and a guide for the drilling device. The guide includes a bearing element with a gap which is delimited by bearing faces and has the shape of a turbine blade edge. Further, the apparatus includes two guide modules which lie opposite one another and are brought to bear with a side face of the turbine blade and which together form a tension device for fixing the guide on the turbine blade. Furthermore, a method for making bores in a turbine blade edge using such an apparatus is provided.

20 Claims, 1 Drawing Sheet

APPARATUS AND METHOD FOR MAKING BORES IN AN EDGE OF A TURBINE BLADE

CROSS REFERENCE TO RELATED APPLICATIONS

This application claims priority of European Patent Office Application No. 08019280.0 EP filed Nov. 4, 2008, which is incorporated by reference herein in its entirety.

FIELD OF INVENTION

The invention relates to an apparatus for making bores in an edge of a turbine blade, with a drilling device and with a guide for the drilling device. The subject of the invention is, furthermore, a method for making bores in an edge of a turbine blade, in which method such an apparatus is used.

BACKGROUND OF INVENTION

Turbine blades are exposed to high loads during operation. In particular, they have to withstand high temperatures in a chemically aggressive atmosphere. It is therefore necessary to cool them so as to prevent premature failure.

The inlet and outlet edges of turbine blades are subjected to particular load. In order to ensure effective cooling here, a multiplicity of cooling air bores are formed in the edges, which are mostly arranged in a row and through which cooling air is then blown out during operation.

Various methods and apparatuses for making cooling air bores in edges of turbine blades are known in the prior art. For example, DE 25 38 653 describes an electrolytic fine drilling method. In this method, a guide is placed onto the turbine blade and has a coaxial guide bore for each bore to be made. A tubular electrode is then pushed forward through each of the individual guide bores in the direction of the edge of the turbine blade in order to form the bores, the guide being intended to ensure that the tubular electrodes impinge onto the edge of the turbine blade at the desired location and at the correct angle.

It is likewise known from the prior art to make bores in the edges of a turbine blade by spark erosion with the aid of rotating electrodes.

SUMMARY OF INVENTION

It has hitherto not been possible by means of the known methods or the apparatuses used in these to make the bores with the necessary precision particularly with regard to the accuracy of their positioning. This is because, while the bores are being made, the orientation of the drilling device cannot be sufficiently adapted to the actual geometry of the turbine blades to be machined which is subject to fluctuations in the unmachined parts. Thus, the apparatuses known in the prior art, above all, do not allow the guide to be put in place and in an angular position with respect to the edge exactly in the way desired.

An object of the claimed invention is to specify an apparatus of the type initially mentioned, by means of which it is possible to make bores in the edge of a turbine blade with high accuracy in terms of position and of angle.

In the apparatus according to the invention, this object is achieved in that the guide possesses a bearing element in which is formed a gap which is delimited by bearing faces and the contour of which corresponds to the shape of a turbine blade edge to be machined, and has at least two guide modules which lie opposite one another and can in each case be brought to bear with a side face of the turbine blade and which together form a tension device for fixing the guide on the turbine blade.

The basic idea of the invention, therefore, is firstly to provide a bearing element with a gap formed in it, in which the turbine blade edge to be machined can be arranged. Secondly, at least two guide modules lying opposite one another are provided, with the aid of which the guide can be fixed on the turbine blade. The bearing element and the guide modules in this case cooperate in order to position the guide in the desired way with high precision in relation to the turbine blade edge to be machined. This makes it possible to make in the edge bores, the position and angle of which conform exactly to requirements, with the aid of the drilling device.

According to a preferred embodiment of the invention, the gap in the bearing element may be delimited by two bearing prisms.

The drilling device may have at least one rotating electrode as the drilling tool. In this case, a clearance for leading through the electrode may be formed in the guide, in particular in the bearing element. Advantageously, in this case, at least that region of the guide in which the clearance is formed may consist of an electrically insulating material. It is also preferred if the clearance is arranged in line with the gap.

In a development of the invention, there is provision for at least one of the guide modules to have a cylindrical locating element. In this case, the locating element may be held on the guide module, in particular, displaceably and fixably.

According to a further preferred embodiment, the bearing element may be connected to the guide releasably and exchangeably. This makes it possible to adapt the apparatus to different turbine blades to be machined.

A further subject of the invention is a method for making bores in an edge of a turbine blade, in which method an apparatus according to the invention is used. The latter is placed onto the turbine blade such that the turbine blade edge to be machined is arranged at least in regions in the gap of the bearing element. The turbine blade is then tension-mounted between the guide modules. Finally, bores are made in the edge of the turbine blade by means of the drilling device.

BRIEF DESCRIPTION OF THE DRAWINGS

The invention is explained in detail below by means of an exemplary embodiment, with reference to the drawing in which.

DETAILED DESCRIPTION OF INVENTION

Figure 1:
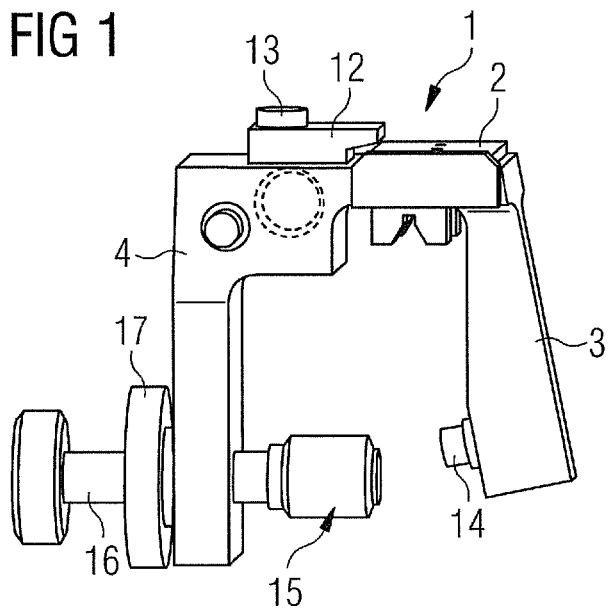
FIG. 1 shows a side view of an apparatus according to the invention.
Figure 2:
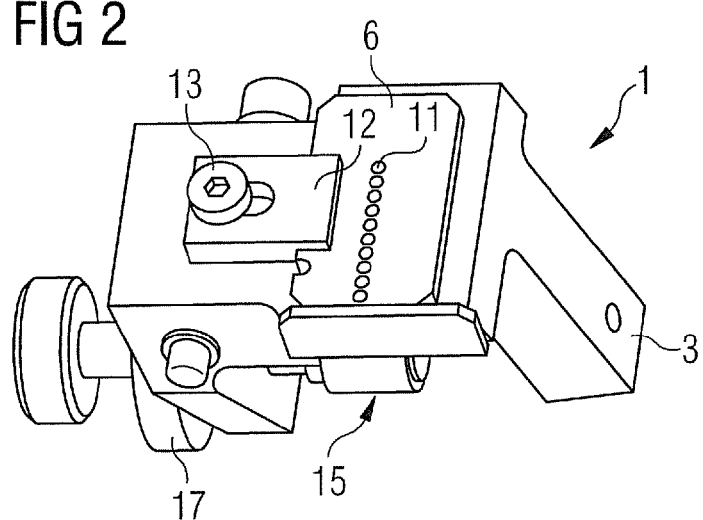
FIG. 2 shows a perspective view of the apparatus of FIG. 1.
Figure 3:
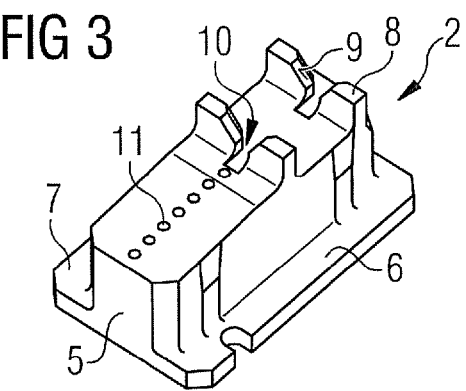
FIG. 3 shows a perspective view of the bearing element of the apparatus of FIG. 1.

FIGS. 1 to 3 illustrate an apparatus according to the invention for making bores in an edge of a turbine blade. The apparatus comprises a drilling device, not illustrated in the drawing, which has a rotating electrode as the drilling tool. The electrode is designed here for machining by spark erosion. Furthermore, the apparatus includes a guide 1.

The guide 1 has a bearing element 2 and two guide modules 3 and 4. The bearing element 2 consists of a basic body 5, flanges 6 and 7 attached laterally thereto and four supporting elements 8 which are arranged in each case in pairs opposite one another and have bearing faces 9. The bearing faces 9 delimit a gap 10 lying between the supporting elements 8. The gap 10 has approximately the shape of an edge of a turbine blade.

A multiplicity of circular clearances 11 are formed in the bearing element 2 in a row and in line with the gap 10. The clearances 11 have here in each case a size and a shape which match those of the electrode of the drilling device. The bearing element 2 consists of an electrically insulating material. This may, for example, be a plastic or a ceramic.

In the assembled state, the bearing element 2 is pushed with its basic body 5 through an orifice in the guide 1, so that the flanges 6 and 7 lie on the margin of the orifice on the guide 1. The bearing element 2 is connected releasably to the guide 1 with the aid of a holding element 12 which engages over said bearing element and is itself attached to the guide 1 via a screw 13.

The guide module 3 illustrated on the right-hand side of the drawing has a rigid cylindrical locating element 14. In contrast to this, the guide module 4 illustrated on the left in the drawing is provided with a displaceable locating element 15. The locating element 15 is held displaceably in a matching recess of the guide module 4 by means of a cylindrically designed portion 16. Said locating element has a locking means 17 which is designed, after being activated, to cancel the free displaceability of the locating element 15 in relation to the guide module 4.

In order, for example, to make cooling air bores in the trailing edge of a turbine blade by means of the apparatus, the following procedure is adopted.

First, the guide 1 is placed onto the turbine blade such that the trailing edge having the region to be machined is arranged in the gap 10 of the bearing element 2. In this case, the supporting elements 8 come to bear with their bearing faces 9 against the turbine blade.

The turbine blade is subsequently tension-mounted between the guide modules 3 and 4. For this purpose, the locating element 15 is displaced until, together with the rigid locating element 14, it comes into clamping contact with the turbine blade. The locking means 17 is then actuated in order to fix the locating element 15 in this position. As a result, the guide 1 is thereby positioned exactly at the desired angle and in the desired position in relation to the turbine blade edge to be machined, in this case the bearing element 2 and the guide modules 3 and 4 cooperating.

Lastly, with the aid of the drilling device, the bores are made in the trailing edge of the turbine blade. For this purpose, an electrical voltage suitable for machining by spark erosion is applied to the rotating electrode and to the turbine blade, and the electrode is led through one of the clearances 11. During machining, the position and orientation of the clearances 11 in the bearing element 2 of the guide 1 ensure that the bore is formed in the intended place, at the intended angle, in the trailing edge of the turbine blade when spark discharge occurs between the electrode and the turbine blade. Thus, bores are made in the trailing edge of the turbine blade in succession in each case through a clearance 11.

It is also possible, alternatively, to use a drilling device which has a plurality of drilling tools likewise arranged in a line. In this case, the bores may be made simultaneously in one pass.

If, for example, bores are to be made in a further turbine blade having a different geometry, the bearing element 2 can be exchanged in the apparatus according to the invention in a simple way. For this purpose, it is necessary merely to release the screw 13, remove the holding element 12 and replace the present bearing element 2 by a new one. Lastly, the holding element 12 then merely has to be fastened to the guide 1 again by means of the screw 13.

The method according to the invention makes it possible to make cooling air bores in the trailing edge of the turbine blade with high precision.

The invention claimed is:

1. An apparatus for making bores in an edge of a turbine blade, comprising:
    a drilling device with a rotating electrode as a drilling tool; and
    a guide for the drilling device,
    wherein the guide includes
        a bearing element, a gap being formed in the bearing element, the gap being delimited by bearing faces and having a contour corresponding to a shape of a turbine blade edge to be machined, and
        at least two guide modules lying opposite one another,
    wherein the guide modules together form a tension device for fixing the guide on the turbine blade, and
    wherein the bearing element of the guide includes a clearance for leading through the rotating electrode.

2. The apparatus as claimed in claim 1, wherein the guide modules, when forming the tension device for fixing the guide on the turbine blade, bear with a side face of the turbine blade.

3. The apparatus as claimed in claim 1, wherein the gap in the bearing element is delimited by two bearing prisms.

4. The apparatus as claimed in claim 1, wherein at least a region of the guide in which the clearance is formed comprises an electrically insulating material.

5. The apparatus as claimed in claim 1, wherein the clearance is arranged in line with the gap.

6. The apparatus as claimed in claim 4, wherein the clearance is arranged in line with the gap.

7. The apparatus as claimed in claim 1, wherein at least one of the guide modules has a cylindrical locating element.

8. The apparatus as claimed in claim 3, wherein at least one of the guide modules has a cylindrical locating element.

9. The apparatus as claimed in claim 4, wherein at least one of the guide modules has a cylindrical locating element.

10. The apparatus as claimed in claim 7, wherein the locating element is fixed and held displaceably on the guide module.

11. The apparatus as claimed in claim 8, wherein the locating element is fixed and held displaceably on the guide module.

12. The apparatus as claimed in claim 9, wherein the locating element is fixed and held displaceably on the guide module.

13. The apparatus as claimed in claim 1, wherein the bearing element is connected releasably and exchangeably to the guide.

14. A method for making bores in a turbine blade edge, comprising:
    providing an apparatus, comprising:
        a drilling device with a rotating electrode as a drilling tool; and
        a guide for the drilling device,
        wherein the guide includes
            a bearing element, a gap being formed in the bearing element, the gap being delimited by bearing faces and having a contour corresponding to a shape of a turbine blade edge to be machined, and
            at least two guide modules lying opposite one another,
        wherein the guide modules together form a tension device for fixing the guide on the turbine blade, and wherein the bearing element of the guide includes a clearance for leading through the rotating electrode;

placing the apparatus onto the turbine blade such that the turbine blade edge to be machined is arranged in a region of the gap of the bearing element, mounting the turbine blade between the guide modules; and making bores in the turbine blade edge by the drilling device.

15. The method as claimed in claim 14, wherein the turbine blade is mounted with tension between the guide modules.

16. The method as claimed in claim 14, wherein the gap in the bearing element is delimited by two bearing prisms.

17. The method as claimed in claim 14, wherein at least a region of the guide in which the clearance is formed comprises an electrically insulating material.

18. The method as claimed in claim 14, wherein the clearance is arranged in line with the gap.

19. The method as claimed in claim 14, wherein at least one of the guide modules has a cylindrical locating element.

20. The method as claimed in claim 19, wherein the locating element is fixed and held displaceably on the guide module.

* * * * *